United States Patent
Schei et al.

(10) Patent No.: US 12,547,690 B2
(45) Date of Patent: Feb. 10, 2026

(54) MULTIMODAL MOTION VISION BASED AUTHENTICATION SYSTEM A METHOD THEREOF

(71) Applicant: Hummingbirds AI Inc, Aventura, FL (US)

(72) Inventors: Nima Schei, Miami Beach, FL (US); Pirooz Parvarandeh, Los Altos Hills, CA (US); Ehsan Foroughi, Toronto (CA)

(73) Assignee: Hummingbirds AI Inc., Aventura, FL (US)

( * ) Notice: Subject to any disclaimer, the term of this patent is extended or adjusted under 35 U.S.C. 154(b) by 286 days.

(21) Appl. No.: 18/384,847

(22) Filed: Oct. 28, 2023

(65) Prior Publication Data

US 2024/0143713 A1    May 2, 2024

Related U.S. Application Data

(60) Provisional application No. 63/420,127, filed on Oct. 28, 2022.

(51) Int. Cl.
G06F 21/32 (2013.01)
(52) U.S. Cl.
CPC .................. G06F 21/32 (2013.01)
(58) Field of Classification Search
CPC ............... G01C 21/3423; G06F 18/256; G06F 2203/0381; G06F 21/32; G06T 2211/464; G06V 40/70; G06V 10/80; G10L 17/10; G01R 33/4808; G02B 6/268; H04B 10/2581

See application file for complete search history.

(56) References Cited

U.S. PATENT DOCUMENTS

| | | | |
|---|---|---|---|
| 2015/0363986 A1* | 12/2015 | Hoyos | H04L 63/0861 340/5.61 |
| 2018/0234849 A1* | 8/2018 | Arshad | G06F 21/32 |
| 2019/0222424 A1* | 7/2019 | Lindemann | G06F 21/32 |
| 2019/0268336 A1* | 8/2019 | Gomi | H04L 9/0819 |

FOREIGN PATENT DOCUMENTS

EP    3529763 B1 * 11/2023    ............. G06F 21/31

* cited by examiner

*Primary Examiner* — Juan M Guillermety
(74) *Attorney, Agent, or Firm* — Jose Cherson Weissbrot

(57) ABSTRACT

The present invention discloses a motion vision-based multimodal authentication system and a method thereof. The system comprises several components, including an information-capturing module, an AI module, a memory unit, a processor unit, and a temporal authentication module. The system captures information data from the user and the user's surroundings, categorize the data into identity and predetermined categories, generates login credentials or authorization keys, and matches the real-time information data for user authorization.

19 Claims, 11 Drawing Sheets

MULTIMODAL MOTION VISION BASED AUTHENTICATION SYSTEM A METHOD THEREOF

FIELD OF THE INVENTION

The present invention relates to the field of user authentication and security systems and methods thereof, and more particularly to a multimodal authentication system that utilizes information data captured from various sources to enhance the security and reliability of user access to applications on devices.

BACKGROUND OF THE INVENTION

As cyber threats are becoming more common and more complex, there's an ever-growing need for more robust and convenient authentication tools, to protect companies and customers from unauthorized access and account takeover. Cybersecurity has become a significant challenge. The need to protect what we have by rightly identifying who we are is the new mandate. In this landscape, password-based mechanisms are becoming insufficient and there's a growing demand for novel phishing-resistant authentication tools. The prevalent Password-based authentication used today has an elemental weakness whereas a password leaked, shared, or stolen is no longer a reasonable proof of identity for an information system.

Biometrics show the best potential when it comes to user experience and robust protection when they are designed and effectively. Facial matching, (the same methodology as Apple's FaceID), is proven to be the most convenient and robust one. Biometric solutions are growing at an accelerated pace and becoming an important tool of multifactor authentication strategies as they combine strong authentication with frictionless experiences.

However, biometrics solutions, in general also have shortcomings. Biometrics solutions are only available in certain devices with special sensors to extract and verify biometrics, such as 3-D cameras, IR cameras, or fingerprint sensors. Biometrics solutions can be fooled by more sophisticated spoof attacks/possibly with deepfakes. Currently available biometrics solutions are good tools for sign-on authentication, but not continuously after login, for example against shoulder surfing. Currently available biometrics solutions cannot be used for automatically logging out the user once the user leaves the device.

Further, in facial recognition authentication methods, the system uses picture frames to store the user's identity and authenticate it with the picture frames of the user captured in real-time. Such picture frames-based authentication techniques can be fooled by more sophisticated spoof attacks/possibly with deepfakes.

User authentication is the critical aspect of ensuring the security and privacy of applications and devices. Traditional methods of authentication as discussed above often rely on single-factor authentication, such as biometrics, passwords or PINs, which can be compromised. Therefore, there is a need for multifactor authentication systems that provide enhanced security by investigating multiple forms of evidence to establish their identity.

SUMMARY OF THE INVENTION

In view of the foregoing disadvantages inherent in the prior art, the general purpose of the present disclosure is to provide a multimodal authentication system and a method thereof, to include all advantages of the prior art, and to overcome the drawbacks inherent in the prior art.

Some of the objects of the present disclosure, which at least one embodiment herein satisfies, are as follows:

An object of the present disclosure is to ameliorate one or more problems of the prior art or to at least provide a useful alternative. An object of the present disclosure is to provide a multimodal authentication system.

Another object of the present disclosure is to provide a multimodal authentication method.

Other objects and advantages of the present disclosure will be more apparent from the following description, which is not intended to limit the scope of the present disclosure.

In view of the above objects, in one aspect, the current disclosure provides a multimodal authentication system and a multimodal authentication method that is a robust and novel phishing-resistant authentication tool.

The multimodal authentication system of the present disclosure facilitates the registration and authentication for access verification of a user attempting to access an application on a device. This system comprises several interconnected components including an information-capturing module, an AI module, a memory unit, a processor unit, and a temporal authentication module. The system captures information data from the user and the user's surroundings, categorize the data into identity and predetermined categories, generates identity data or authorization key instruction, and matches the real-time information data with the identity data and authorization key instruction for user authorization.

Firstly, the information-capturing module is configured to continuously capture a real time video and comprehensive information data concerning both the user and their immediate environment. This captured video and information data is then relayed to an AI module, which is communicably coupled with the information-capturing module. In an embodiment, the information capturing module has a motion picture capturing device. The motion picture capturing device is configured to capture a live video stream of the motion picture capturing device's terminal access field of view and surroundings as a basis mode.

The AI module performs a liveliness and authenticity assessment on the user and subsequently categorize the information data into distinct categories, including identity data and predefined categories. These categories result in the generation of categorized data. The AI module is further configured to identify a registered user and a non-registered user.

Furthermore, the memory unit is communicably coupled with the AI module, serving as a repository for storing the identity data, categorized data, and data originating from within the multimodal authentication system. Additionally, the processor unit is communicably coupled to the memory unit and is responsible for generating a first key instruction and second key instruction, based on the categorized data. The generated first and second key instruction is then employed in conjunction with a temporal authentication module, which is coupled to the processor unit and the information-capturing module. The temporal authentication module, during registration, matches the real-time video and information data with the first key instruction, thereby determining whether to grant or restrict registration. The temporal authentication module, during authentication, matches the real-time information data with the second key instruction, thereby determining whether to grant or restrict authorization for access. In an embodiment, the multimodal authentication system encompasses supplementary components, including a display unit and a speaker, both communicably linked to the processor unit. This configuration enables the processor unit to exhibit prompts or display colours on the display unit while simultaneously producing audio prompts or playing music via the speaker. The temporal authentication module then matches the real-time information data with either the first or second key instruction, thereby determining whether to grant or restrict registration authorization for access.

The AI module of the multimodal authentication system categorizes information data into a range of predetermined categories, which include object, biometric, lighting, and action.

The object category encompasses multiple object categorizations, such as generic objects (GO) which incorporate common or generic objects that lack specific personal associations, and specific objects (SO) that are linked to a user's identity. Specific objects further divided into unique objects possessed solely by the user, such as an ID document or mobile application access, and biometric signatures, such as palms, fingers, and faces.

The biometric category consists of one or more unique biological characteristics distinguishing individual users from one another. These characteristics encompass face, voice, and fingerprint data.

The lighting category encompasses elements such as ambient lighting, non-ambient lighting, predefined colour sequences, and the absence of light.

The action category involves distinct movements and expressions, including facial expressions, eye movements, hand gestures, torso movements, and common object movements.

In an embodiment, the multimodal authentication system additionally integrates a network that facilitates communicable coupling throughout the system, enhancing seamless data exchange.

The multimodal authentication system illustrates the information-capturing module's versatility, which may comprise a video camera, lens modules serving as fingerprint capture devices, voice receivers, fingerprint sensors, infrared sensors, keyboards, mice, radar imagers, ultrasound sensors, radio frequency sensors, or combinations thereof.

In an aspect, the present disclosure provides a lens module. The lens module includes a transparent mechanical structure characterized by a front side, a back side, and a recess accommodating a laptop camera. This lens module includes a convex lens positioned on the front side at predetermined distances from the laptop camera, wherein the lens's refractive index surpasses that of the mechanical structure. Furthermore, a front surface is positioned at a predetermined distance from the far end of the convex lens. The convex lens has a near end and a far end is fixed on the front side at a predetermined distance D1 from the near end and D2 from far end to the laptop camera. The front surface is provided on the front side at a predetermined distance D3 from the far end of the convex lens.

In an embodiment, the multimodal authentication system introduces an administrator terminal accessible to authorized personnel. This terminal is communicably linked with the memory unit, processor unit, and temporal authentication module, thereby allowing manual user registration and authorization for application access.

In another embodiment, the information data in the registration and access verification authentication phases is a video or audio to ensure the capturing of at least one temporal element to construct a temporal embedding/movement. This approach ensures a more robust authentication process.

In another aspect, the present disclosure provides a multimodal authentication method for registering and authenticating users attempting to access an application on a device. The method entails the registration process, which involves capturing various information data pertaining to the user and their surroundings. Subsequently, a identity data is generated based on the captured video and information data to facilitate user registration. This process is followed by user's access verification for authentication, wherein matching the generated identity data with a real-time video and information data of the user for granting access.

The registration step encompasses steps of capturing of video and information data of a user and user's surrounding by an information-capturing module. The AI module evaluates user liveliness and authenticity of the user and identifies identity data from the captured video and information data. This identity data is stored in a memory unit, and then the registration of the user is allowed by the system.

In an embodiment, wherein if the AI module is unable to investigate the liveliness and authenticity of the user, the method further includes additional steps, such as categorizing, by the AI module, video and information data into categorized data and then processing, by the processing unit, the categorized data in a processing unit to generate at least one first key instruction. Subsequently, prompting the first key instruction to the user via a display unit. Subsequently, the user provides inputs in response to the first key instructions that are captured in real-time, matching the response of user with the first key instruction, and used to determine user registration eligibility for access to the application.

The information data is categorized by the AI module in predetermined categories including object, biometric, lighting, and action, which guide the categorization and processing of captured information data.

In an embodiment, an authorized personnel manages user registration and authorization through an administrator terminal.

In another embodiment, the information data is video data during the registration phase to capture at least one temporal element, facilitating the creation of a temporal embedding/movement.

The access verification authentication phase of the multimodal authentication method encompasses step of capturing video and information data of the user and user's surroundings and storing identity data of the user derived from the captured video and information data. Further, the user liveliness and authenticity assessment is investigated by the AI module, categorization of information data into predetermined categories, and storage of characterized data in a memory unit. Additionally, the method involves checking the user's login credential against the stored login credential, processing the characterized data to generate a key, matching the key with real-time information data captured by the information-capturing module, and allowing or denying user access based on the key's match with the information data. After the liveliness and authenticity assessment, matching of the key identity data of the user with the real-time video and information data captured by the information-capturing module is performed by the by the temporal authentication module. If the identity data matches with the real-time video and information data, the system grants access to the user. If the identity data fails to matches with the real-time video and information data, the system denies access to the user.

In an embodiment, if the AI module is unable to investigate the liveliness and authenticity of the user during authentication, the method further comprises steps of categorization of video and information data into predetermined categories, and storage of characterized data in a memory unit, and processing the categorized data in a processing unit to generate at least one second key instruction. Subsequently, prompting the second key information to the user through a display unit, capturing real-time user inputs in response to the second key information, matching these inputs with the second key information, and determining user access eligibility based on the match. The predetermined categories play an important role in the categorization and processing of data throughout the access verification process based on which the access verification keys are generated.

In another embodiment, there is the involvement of authorized personnel using an administrator terminal to manage user registration and authorization.

In preferred embodiments, the video data is a preferred choice of information data during the registration phase to capture at least one temporal element, enabling the construction of a temporal embedding/movement for enhanced authentication.

The multimodal authentication system and method disclosed in the present invention provide a secure and reliable solution for user's access verification. By combining various forms of information data and AI analysis, the system enhances security and reduces vulnerability to attacks. The system can be employed across various devices and applications to ensure user access while maintaining robust security measures.

BRIEF DESCRIPTION OF DRAWING

The foregoing summary, as well as the following detailed description of various embodiments, is better understood when read in conjunction with the drawings provided herein. For the purposes of illustration, there is shown in the drawings exemplary embodiments; however, the presently disclosed subject matter is not limited to the specific methods and instrumentalities disclosed.

Like reference numerals refer to like parts throughout the description of several views of the drawing.

DETAILED DESCRIPTION OF THE INVENTION

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open-ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

The following detailed description should be read with reference to the drawings, in which similar elements in different drawings are identified with the same reference numbers. The drawings, which are not necessarily to scale, depict illustrative embodiments and are not intended to limit the scope of the disclosure.

It is to be understood that both the foregoing general description and the following detailed description are exemplary and explanatory only and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements and components comprising one unit and elements or components that comprise more than one unit unless specifically stated otherwise.

Figure 1:
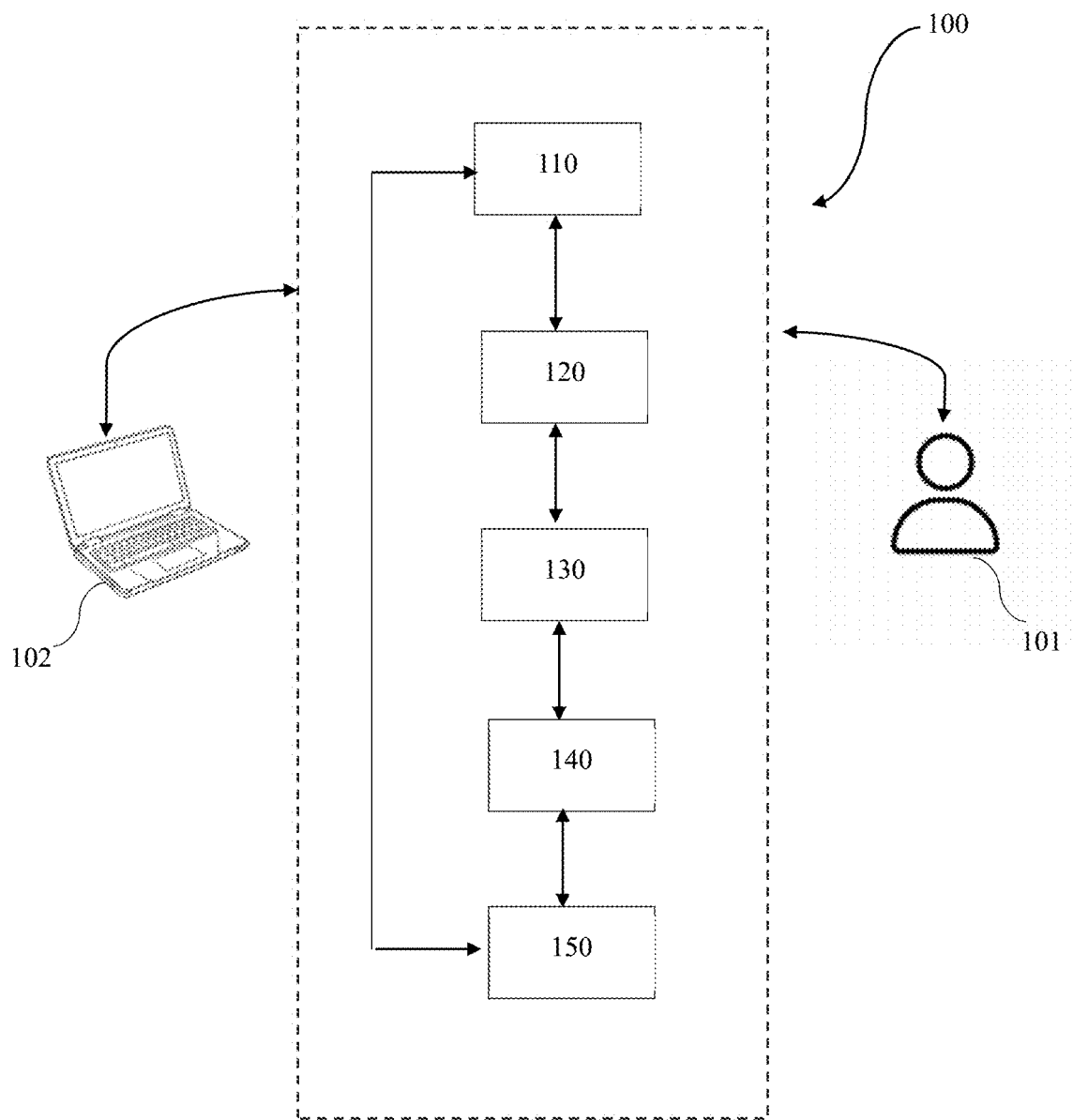
FIG. 1 illustrates a schematic view of a multimodal authentication system, according to one aspect of the present disclosure disclosed herein.
Figure 2:
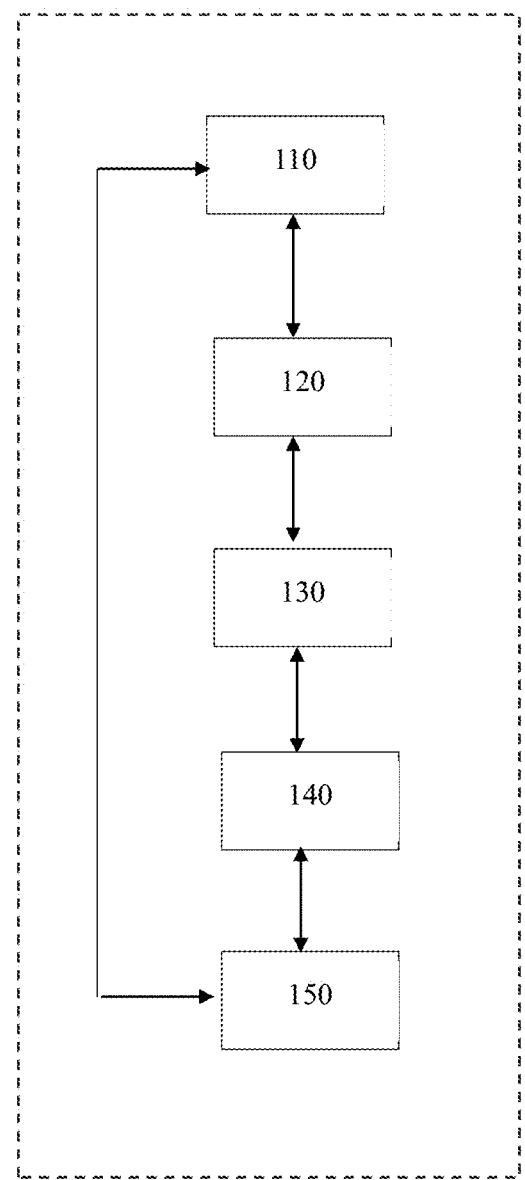
FIG. 2 illustrates a schematic view of the multimodal authentication system, according to one embodiment of the present disclosure.

As illustrated in FIG. 1, a multimodal authentication system 100 (herein after referred as the "system") is disclosed in the present disclosure for facilitating the registration and access verification of a user 101 attempting to access an application on a device 102. As illustrated in FIG.

2, the system 100 comprises several interconnected components including an information-capturing module 110, an AI module 120, a memory unit 130, a processor unit 140, and a temporal authentication module 150. The system 100 captures information data from the user 101 and the user's surroundings, categorize the data into identity and predetermined categories, generates user's identity data or authorization key instructions, and matches the real-time information data with the identity data and authorization key instruction for user authorization.

The multimodal authentication system 100 uses a combination of computer hardware and biometrics to create better authentication tools that are robust, based on something the user has, as well as something the user do. Using a combination of multimodal categories (object+biometrics+lighting+action) based authentication to offer a step forward. The multimodal authentication system is accurate, secure, privacy-first, cost-effective, simple to use and highly scalable. In addition, the multimodal authentication system is adaptable to work on legacy hardware devices.

Firstly, the information-capturing module 110 is configured to continuously capture a real-time video and comprehensive information data concerning both the user and their immediate surrounding. This captured video and information data is then relayed to an AI module 120, which is communicably coupled with the information-capturing module 110. In an embodiment, the information capturing module has a motion picture capturing device. The motion picture capturing device is configured to capture a live video stream of the motion picture capturing device's terminal access field of view and surroundings as a basis mode.

The AI module 120 performs a liveliness and authenticity assessment on user 101 and subsequently categorizes the information data into distinct categories, including identity data and predefined categories. These categories result in the generation of categorized data. The AI module is further configured to identify a registered user and a non-registered user.

Furthermore, the memory unit 130 is communicably coupled with the AI module 120, serving as a repository for storing the identity data, categorized data, and data originating from within the multimodal authentication system 100. Additionally, the processor unit 140 is communicably coupled to the memory unit 130 and is responsible for generating a first key instruction and second key instruction, based on the categorized data. The generated first or second key instructions are then employed in conjunction with a temporal authentication module 150, which is coupled to the processor unit 140 and the information-capturing module 110. The temporal authentication module 150, during registration, matches the real-time information data with the first key instruction, thereby determining whether to grant or restrict registration. The temporal authentication module 150, during authentication, matches the real-time information data with the second key instruction, thereby determining whether to grant or restrict authorization for access.

Figure 3:
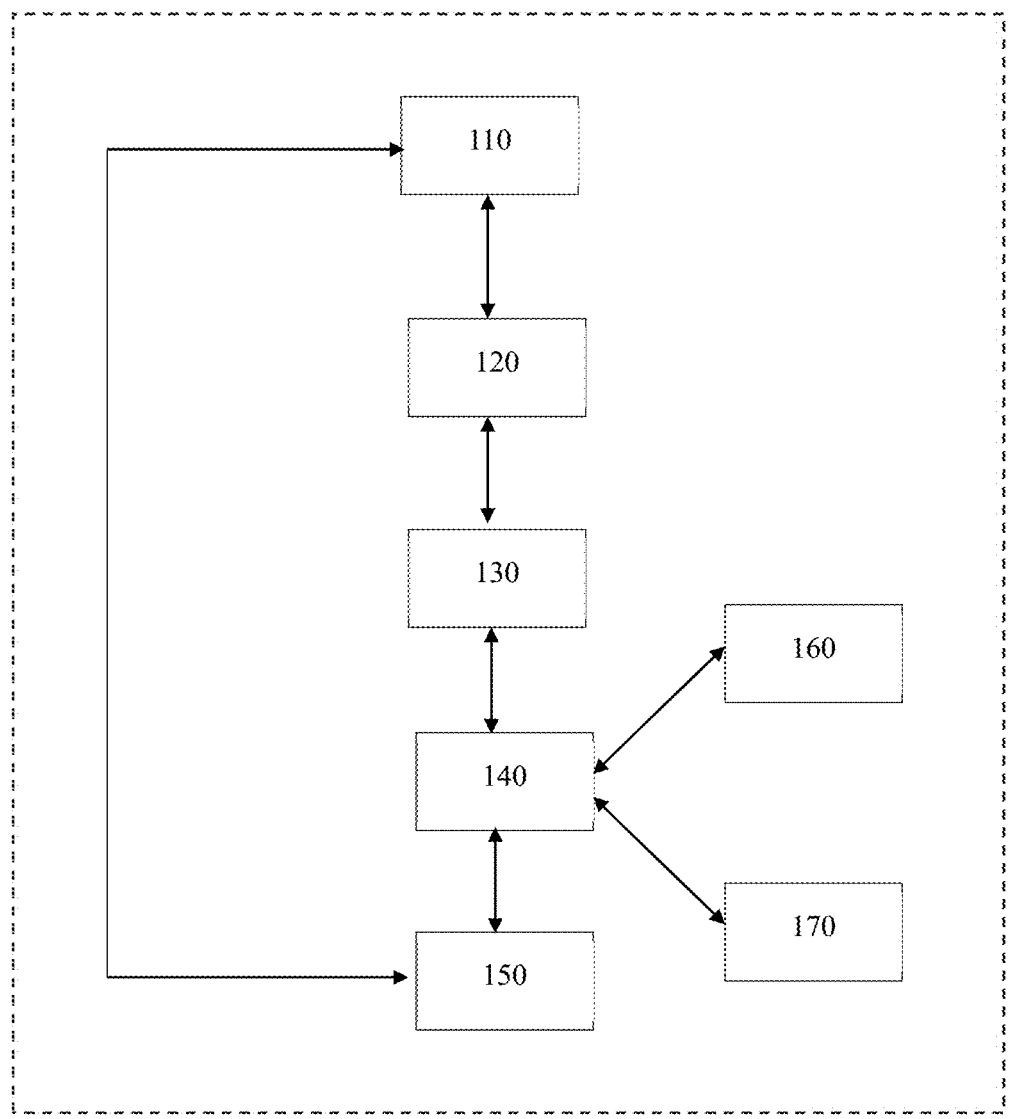
FIG. 3 illustrates a schematic view of the multimodal authentication system, according to another embodiment of the present disclosure.

In an embodiment, as illustrated in FIG. 3, the multimodal authentication system encompasses supplementary components, including a display unit 160 and a speaker 170, both communicably linked to the processor unit 140. This configuration enables the processor unit 140 to exhibit prompts or display colours on the display unit 160 while simultaneously producing audio prompts or playing music via the speaker 170. The temporal authentication module 150 then matches the real-time information data with either the first or second key instructions, thereby determining whether to grant or restrict registration or authorization for access.

The multimodal authentication system use a combination of multimodal categories. The AI module 120 of the multimodal authentication system 100 categorizes information data into a range of predetermined categories, which include object, biometric, lighting, and action. Within each category, one or more of the items in the category can be used for the authentication.

This construct of multimodal categories is used in order to avoid an excessively long description. For example, if we have N categories and M items within each category, and we use one item from the M categories, we will have N×M combinations. This complexity expands even further if more than one item is used from each category.

The object category encompasses multiple object categorizations, such as generic objects (GO) which incorporate common or generic objects that lack specific personal associations, and specific objects (SO) that are linked to a user's identity. Specific objects further divided into unique objects possessed solely by the user, such as an ID document or mobile application access, and biometric signatures, such as palms, fingers, and faces. One or multiple objects defined bellow is used to authenticate the access or block the access if specific blacklisted objects/persons are detected. For example, Table 1 describes the different multimodal object item.

TABLE 1

Multimodal object categories

| Type of item | Source of data | Object type |
|---|---|---|
| Face | Video | SO (P), GO (A) |
| Lips (For syncing voice with lips movements in real-time) | Video | GO (P) |
| Torso | Photo/Video | GO(A) |
| ID document | Video | SO (P&A) |
| Hand | Video | SO(A) & GO (A) |
| Palm/palm print | Video | SO(A) & GO (A) |
| Finger | Video | SO(A) & GO (A) |
| Iris | Photo/Video | SO(P&A) & GO (A) |
| Common objects (Show me a book, phone, paper, pen, etc) | Photo/Video | GO (A) |
| Phone screen | Photo/Video | SO(P&A) & GO (A) |
| Someone lurking in the background (Lock the access if an "intruder" is detected) | Video | SO(A) & GO (A) |

In Table 1, GO=General Object, SO=Specific Object, A=Alternative possibility, P=Primary means. For example, SO(P) equals to Specific Object (primary means). In case the object item is phone screen, an application installed on the user's phone, verifies the user independently, generates a unique code (barcode, QR code, NFT, etc) and the user shows it to the camera. Holding that unique code equals a verified identity. In this case, the app can also extract the GPS location of the user, to match the GPS location of the authentication device. In the case of Lips, the model is created to understand the association between lips movement and voice. In the voice recognition systems in order to differentiate if the voice is generated through deepfake or if it's original, the model matches lips movement with the voice to see if there's a match.

In an embodiment, all Specific Objects are used as Generic Objects for verifying liveness. For further clarity, a general object is a "book" where the system does not care about attributes such as its name, size, colour etc. On the other hand, a specific object is a book that has a unique identifier, such as a specific barcode or QR code.

The biometric category consists of one or more unique biological characteristics distinguishing individual users from one another. These characteristics encompass face, voice, and fingerprint data. In one embodiment, biometric is part of the Specific Object. These are the bio characters that are unique for every individual user and are used to distinguish among different individuals.

The lighting category encompasses elements such as ambient lighting, non-ambient lighting, predefined colour sequences, and the absence of light. The lighting can create different shadows/reflections that may be used to detect a real object (i.e. face, palm, ID) from a spoofed one. The lightening multimodal category comprises ambient light, light from the display unit, light from the display that changes in specific colour pattern. Presentation of lighting consists of different colors, intensity, in any arbitrary sets and forms. The presentation of colors may be static or dynamic. It intends to extract information that is otherwise hard to extract.

In an exemplary embodiment, a series of predefined colours, shapes or patterns that change over time are shown on the display unit and the system analyses the reflection of these colours on the face of the user. If an unauthorized user tries to get authenticated through showing a printed photo or a picture from a device, the reflection will be different than a real one. In addition, this helps to detect 3D spoof attacks. In these cases, the camera is able to extract the changes on the object, and distinguish between the real object and a fake object.

The action category involves distinct movements and expressions, including facial expressions, eye movements, hand gestures, torso movements, and common object movements. By using video, rather than images, on both registering and verification phases, the system make sure to capture the temporal element, which is used to construct the temporal embedding/movement. The desired action is referred to as the Login credential or KEY.

In an exemplary embodiment, the processing unit prompts a first key instruction or second key instruction on the display unit, asking the user to perform a certain action, which when performed by the user will be captured by the information capturing module and considered as a key or Login credential by the system to provide registration or access to the user.

In an embodiment, the multimodal authentication system 100 additionally integrates a network 180 that facilitates communicable coupling throughout the system 100, enhancing seamless data exchange. The network is selected from a wired or wireless network.

The multimodal authentication system 100 illustrates the information-capturing module's versatility, which may comprise a video camera, lens modules serving as fingerprint capture devices, voice receivers, fingerprint sensors, infrared sensors, keyboards, mice, radar imagers, ultrasound sensors, radio frequency sensors, or combinations thereof.

Figure 5:
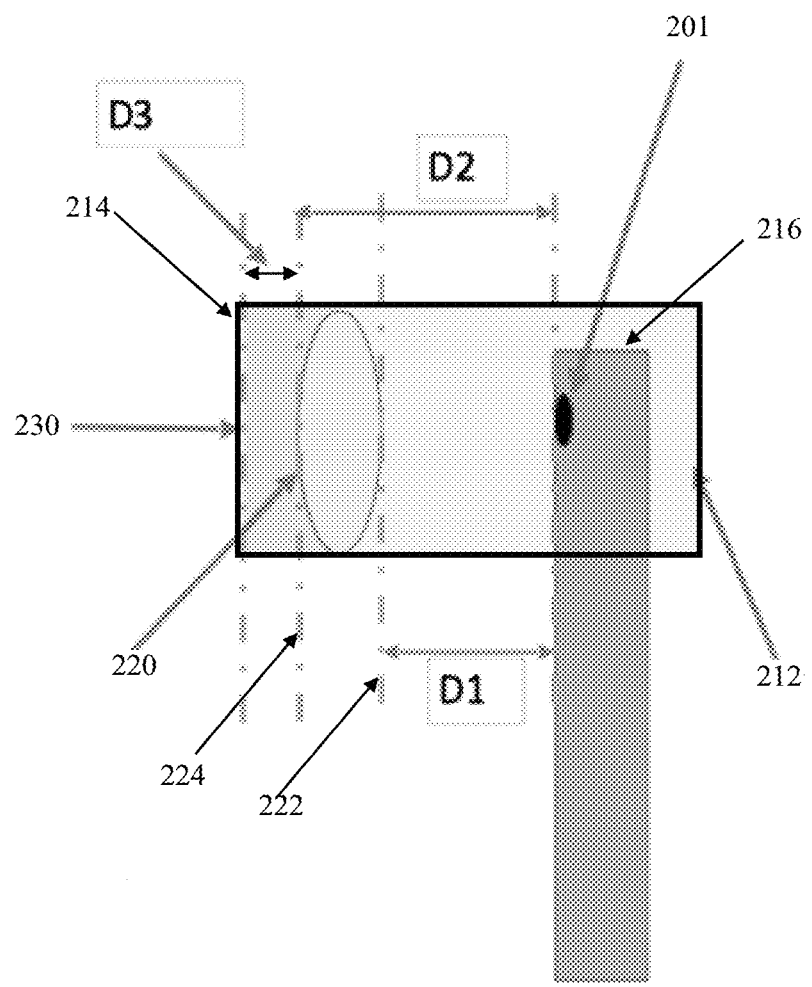
FIG. 5 illustrates a lens module, according to one embodiment of the present disclosure disclosed herein.
Figure 6:
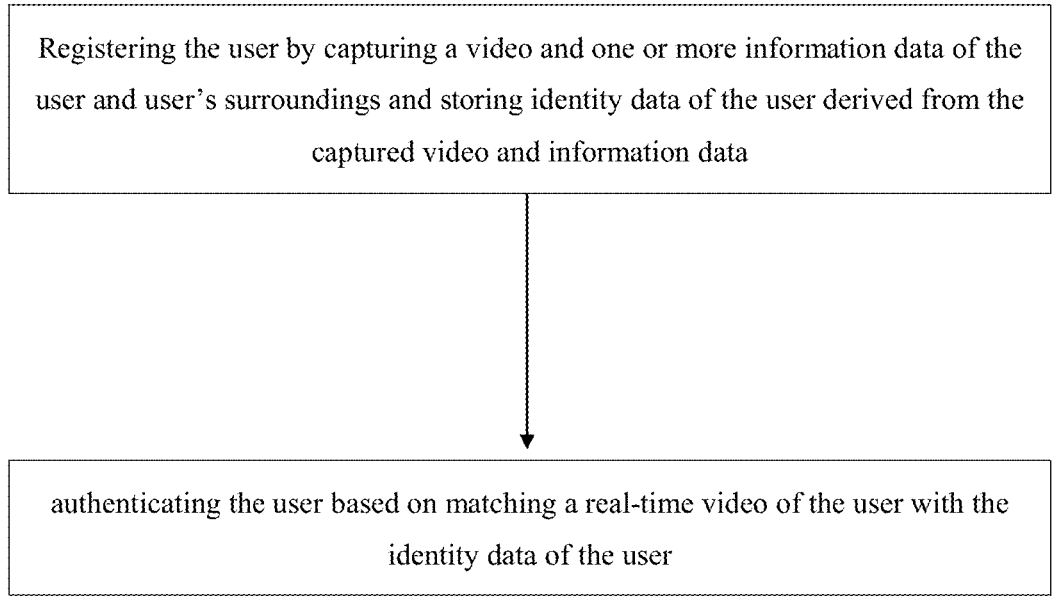
FIG. 6 illustrates a flowchart illustrating a multimodal authentication method, according to another aspect of the present disclosure.

In an aspect, as illustrated in FIG. 5, the present disclosure provides a lens module 200. The lens module 200 includes a transparent mechanical structure 210 defined by a front side 212, a back side 214, and a recess 216 accommodating a laptop camera 201. This lens module includes a convex lens 220 positioned on the front side 212 at specific distances from the laptop camera 201, wherein the lens's refractive index surpasses that of the mechanical structure. Furthermore, a front surface 230 is positioned at a predetermined distance from the far end 224 of the convex lens 220. The convex lens 220 has a near end 222 and a far end 224 is fixed on the front side 212 at a predetermined distance D1 from the near end 222 and D2 from the far end 224 to the laptop camera. The front surface 230 is provided on the front side 212 at a predetermined distance D3 from the far end of the convex lens 220.

The objective of providing the lens module is to use minimal additional hardware burden on the user, working on the most basic and accessible sensors the user has access to. However, in the "object" category, some of the items might not be detectable using regular webcams/integrated cameras, such as fingerprints or palm ridges. The camera on laptops may not be of high enough resolution and it is generally geared toward focusing on objects in the "far-field". So a "lens-like" device is created that attaches in front of the monitor camera. The surface of this lens-like device can be designed such that it "enhances" the visibility of the ridges on a finger. Image processing algorithms can be used on the laptop to sharpen the image. This is a "poor-man's way" of creating an optical fingerprint sensor and an economical alternative to finger print sensor. Similar to the other items in the disclosure, The system is configured to instruct the user to move their finger in different directions upon receiving a command from the monitor (login credential or KEY).

Fingerprint sensing is not a fool-proof biometric identification method. It can be fooled. On the other hand, as you increase the number of inputs required for authentication, you are increasing the robustness of the system. One of the ways in which fingerprinting can be made more robust is to ask the user to press their finger in a slow manner on the optical "lens-like" device. In this manner, only a portion of the finger comes into focus and as the user presses more, then more regions of the finger become visible. The user's adherence to these instructions can be monitored and evaluated for liveness. In addition, the user is instructed to present their fingerprint from multiple different angles or they can be instructed to rotate their finger according to instructions received. This device serves as an optical accessory for fingerprint reading (if the laptop does not have a fingerprint reader). Similar optical accessories can be used for obtaining better images of an iris or the palm of a hand.

Figure 4:
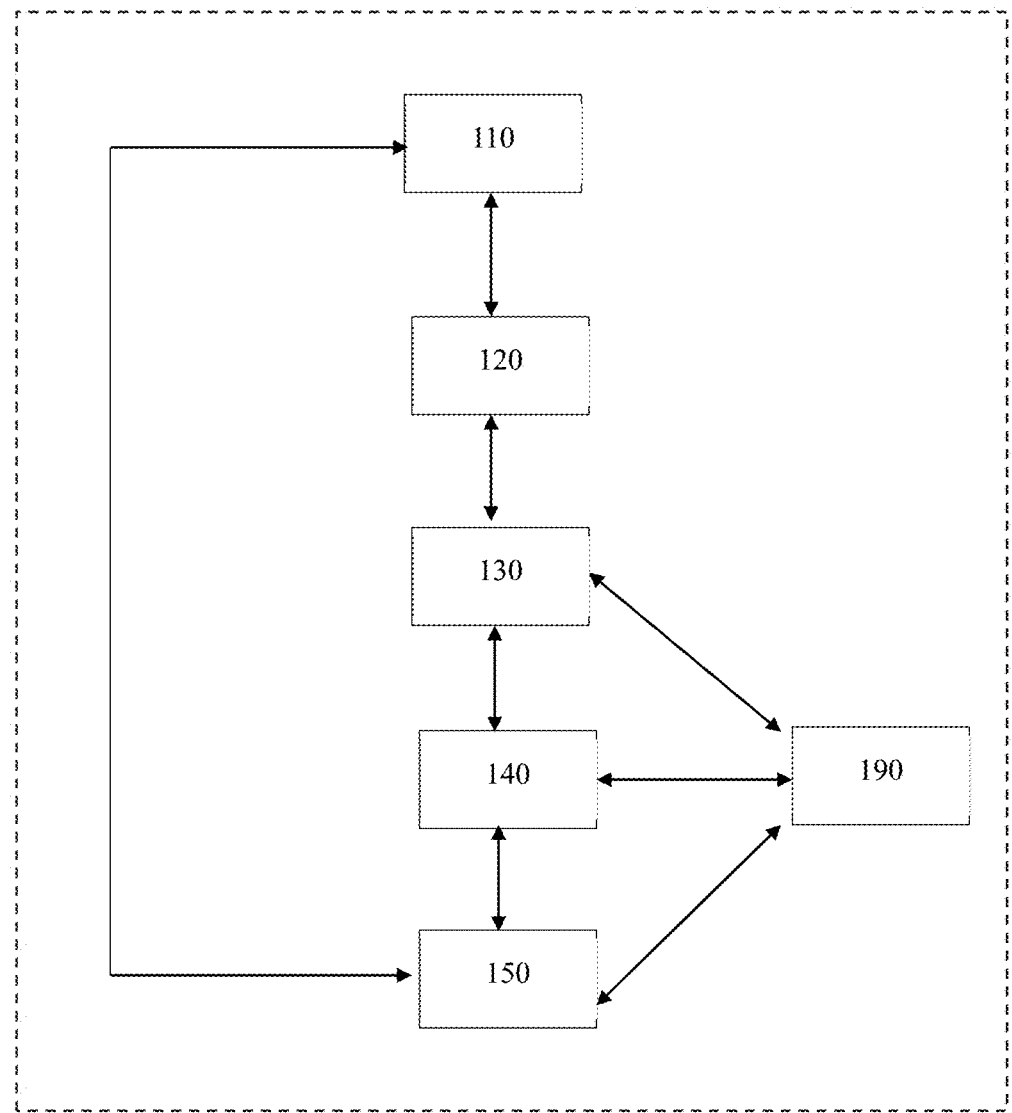
FIG. 4 illustrates a schematic view of the multimodal authentication system, according to one embodiment of the present disclosure.

In an embodiment, as illustrated in FIG. 4, the multimodal authentication system 100 further comprises an administrator terminal 190 accessible to authorized personnel. This administrator terminal 190 is communicably coupled with the memory unit 130, processor unit 140, and temporal authentication module 150, thereby allowing manual user registration and authorization for registration and access verification by the authorized personnel.

The information data in the registration and access verification phases is a video or audio to ensure the capturing of at least one temporal element to construct a temporal embedding/movement. This approach ensures a more robust access verification process.

In another aspect, as shown in FIG. 5, the present disclosure provides a multimodal authentication method for registering and authenticating users attempting to access an application on a device 102. The method entails the registration process, which involves capturing video and various information data pertaining to the user and their surroundings. Subsequently, a identity data is generated based on the captured video and information data to facilitate user registration. This process is followed by user's access verification for authentication, wherein matching the generated identity data with a real-time video and information data of the user for granting access.

Figure 7:
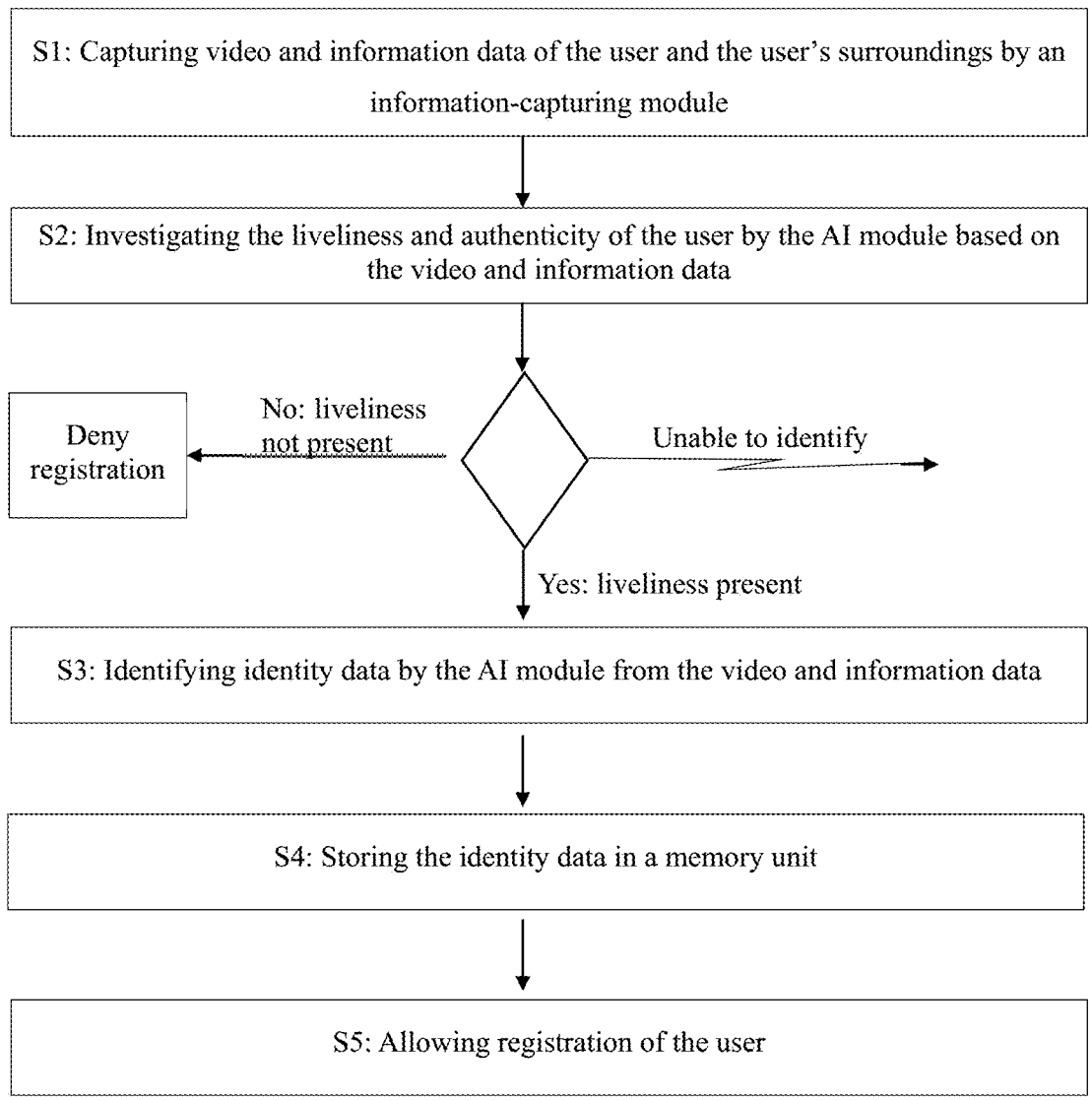
FIG. 7 illustrates a flowchart illustrating the registration part of the multimodal authentication method, according to an embodiment of the present disclosure.

As illustrated in FIG. 7, the registration phase encompasses steps of capturing of video and information data of a user and user's surrounding by an information-capturing module 110. The AI module 120 evaluates user liveliness and authenticity of the user and identifies identity data from the captured video and information data. This identity data is stored in a memory unit 130, and then the registration of the user is allowed by the system.

Figure 8:
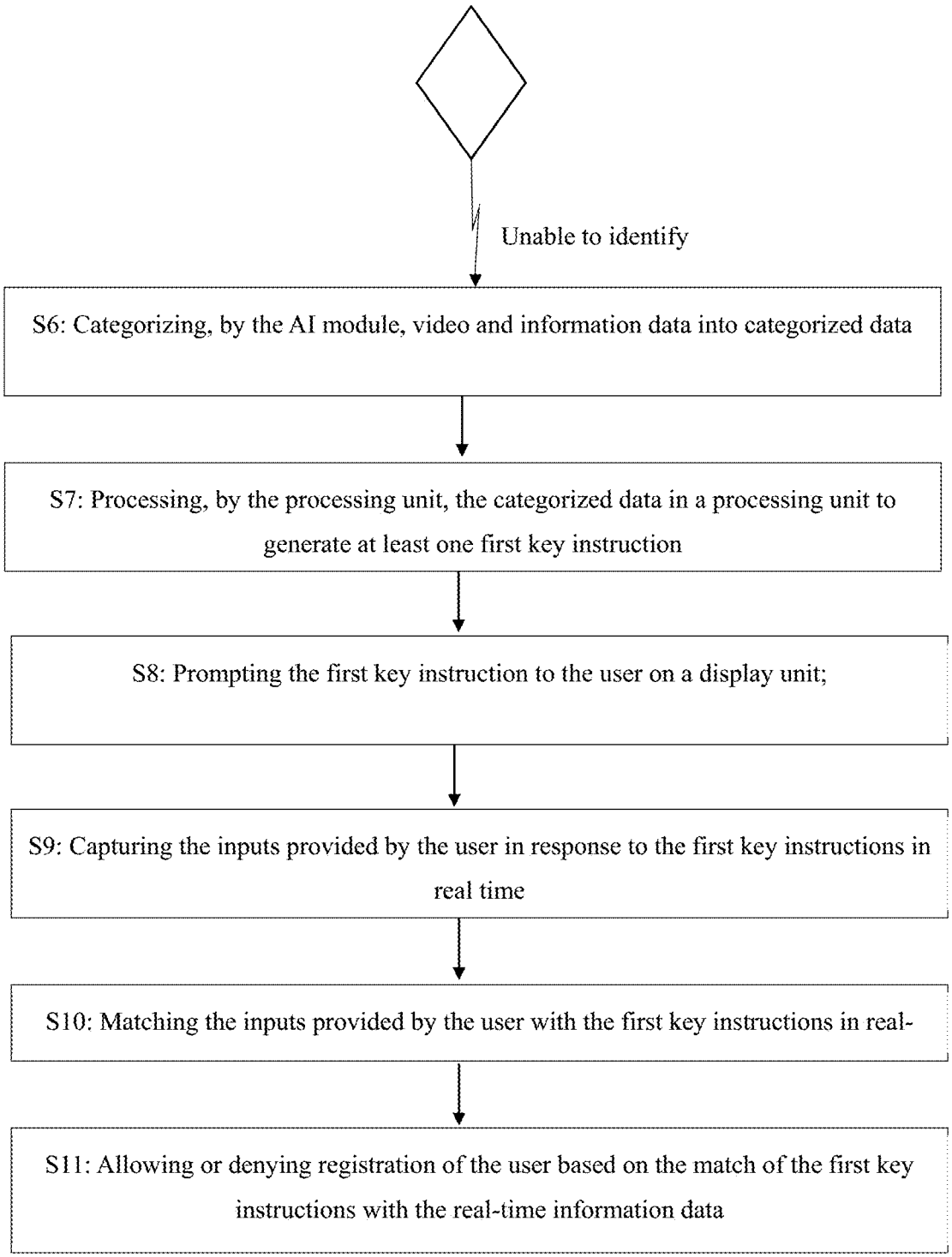
FIG. 8 illustrates a flowchart illustrating the registration part of the multimodal authentication method, according to another embodiment of the present disclosure.

In an embodiment, as illustrated in FIG. 8, wherein if the AI module is unable to investigate the liveliness and authenticity of the user, the method further includes additional steps, such as categorizing, by the AI module, video and information data into categorized data and then processing, by the processing unit, the categorized data in a processing unit to generate at least one first key instruction. Subsequently, prompting the first key instruction to the user via a display unit 160. Subsequently, the user provides inputs in response to the first key instruction that are captured in real time, matching the response of user with the first key instruction to determine user registration eligibility for access to the application.

The information data is categorized by the AI module 130 in predetermined categories including object, biometric, lighting, and action, which guide the categorization and processing of captured information data.

In an embodiment, an authorized personnel manages user registration and authorization through an administrator terminal 190.

In another embodiment, the information data used is video data during the registration phase to capture at least one temporal element, facilitating the creation of a temporal embedding/movement.

Figure 9:
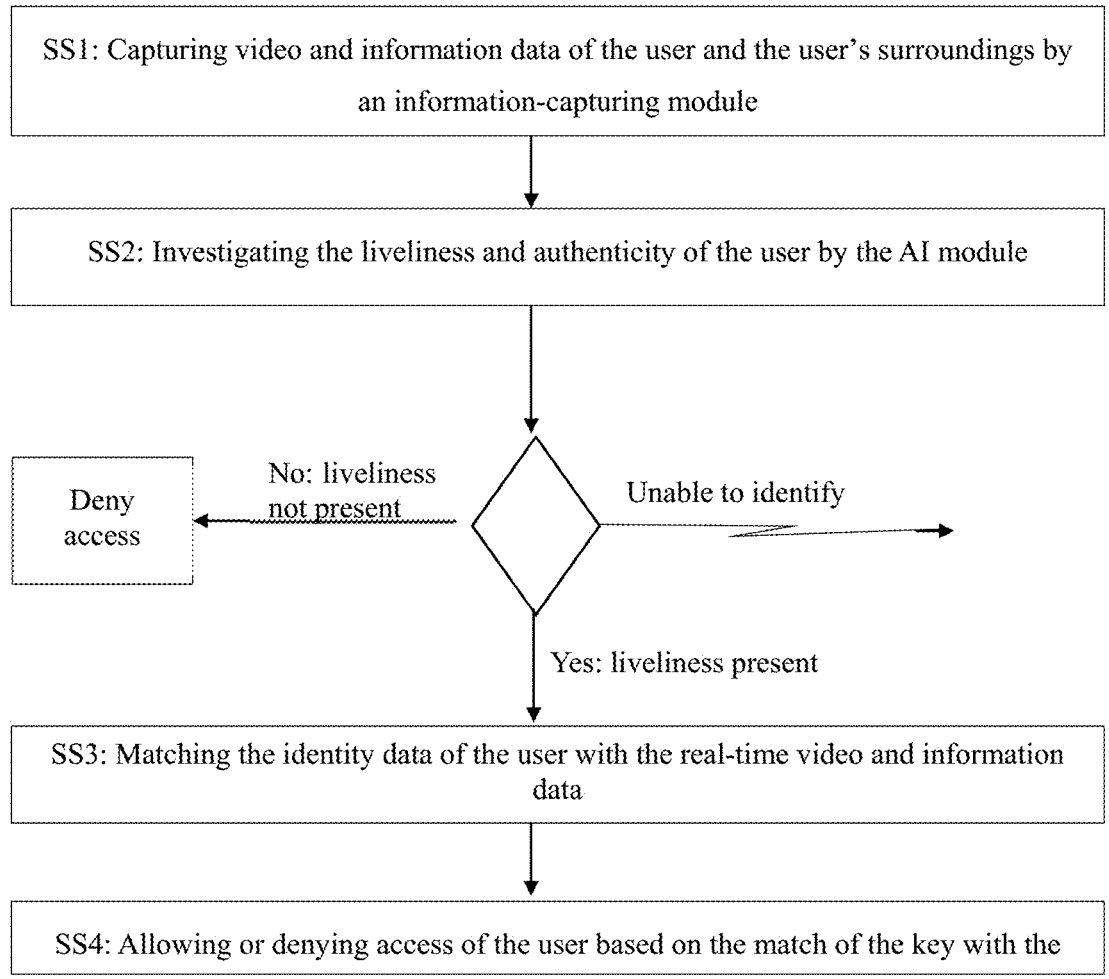
FIG. 9 illustrates a flowchart illustrating the access verification part of the multimodal authentication method, according to an embodiment of the present disclosure.

As illustrated in FIG. 9, the access verification authentication phase of the multimodal authentication method encompasses steps of capturing video and information data of the user and user's surroundings and storing identity data of the user derived from the captured video and information data. Further, the user liveliness and authenticity assessment is investigated by the AI module 120. After the liveliness and authenticity assessment, matching of the key identity data of the user with the real-time video and information data captured by the information-capturing module is performed by the by the temporal authentication module. If the identity data matches with the real-time video and information data, the system grants access to the user. If the identity data fails to matches with the real-time video and information data, the system denies access to the user.

Figure 10:
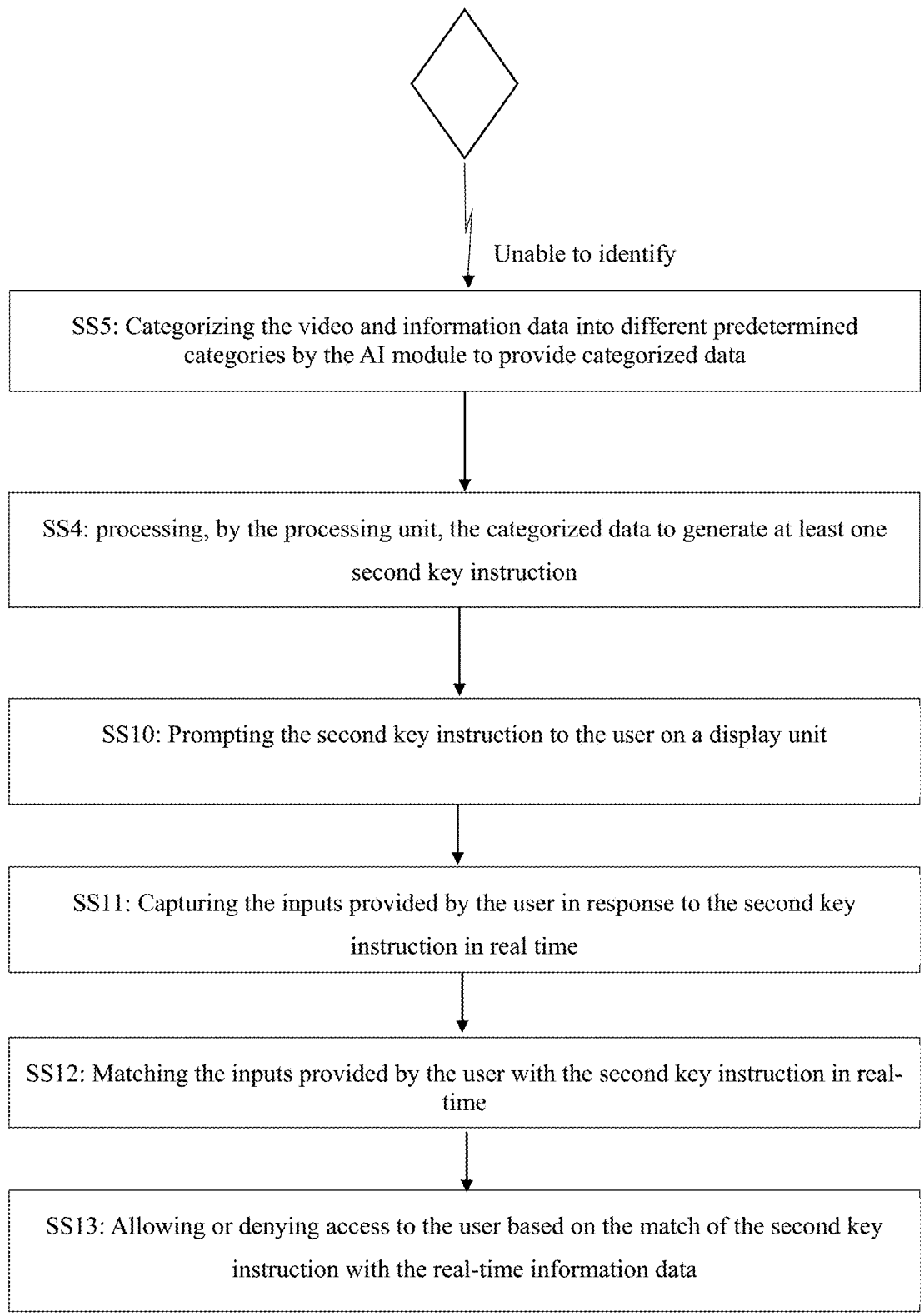
FIG. 10 illustrates a flowchart illustrating the access verification part of the multimodal authentication method, according to another embodiment of the present disclosure.

In an embodiment, as illustrated in FIG. 10, if the AI module is unable to investigate the liveliness and authenticity of the user during authentication, the method further comprises steps of categorization of video and information data into predetermined categories, and storage of characterized data in a memory unit 130 and processing the categorized data in a processing unit to generate at least one second key instruction. Subsequently, prompting the second key instruction to the user on a display unit and capturing the inputs provided by the user in response to the second key instruction in real-time. Further, the method involves matching the user's inputs against the stored second key information. allowing or denying user's access to the application based on the match of the second key instruction with the real-time video and information data of the user's input.

In another embodiment, there is the involvement of authorized personnel using an administrator terminal 190 to manage user registration and authorization.

In preferred embodiments, the video data is a preferred choice of information data during the registration phase to capture at least one temporal element, enabling the construction of a temporal embedding/movement for enhanced access verification.

Figure 11:
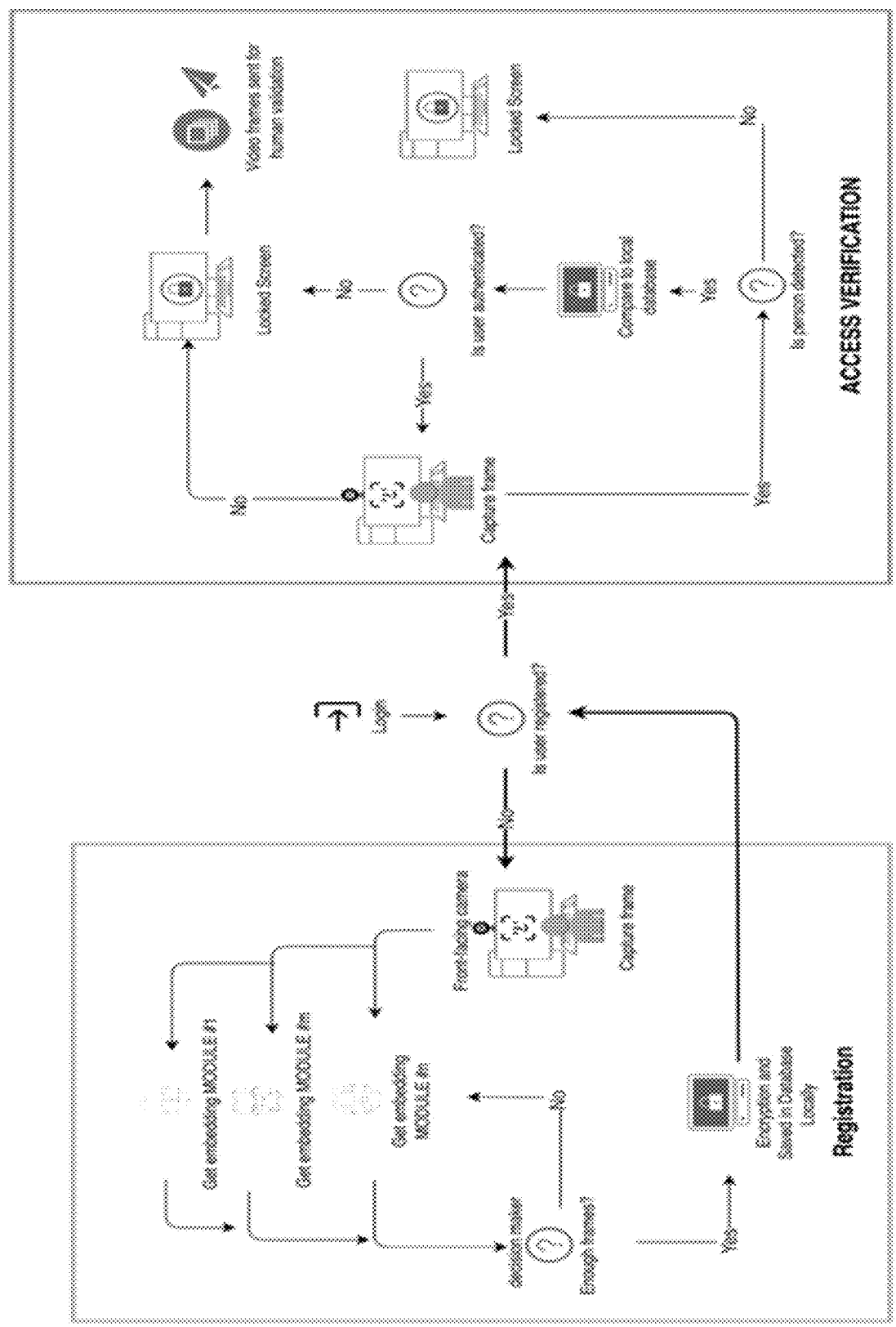
FIG. 11 illustrates a schematic diagram of the multimodal authentication method according to one embodiment of the present disclosure.

In an exemplary embodiment, as illustrated in FIG. 11, a user attempts to access an application in a device. The multimodal authentication system directs the user to the registration phase. During the registration phase a plurality of the video frames of the user and the user's surrounding are captured to create encrypted login credentials and stored in the memory unit such as a local data base. In the next step the multimodal authentication system directs the user to the access verification phase. During the access verification, the information capturing module such as a camera captures the video frames of the user and matches it with the login credentials stored in the local database. If the captured video frames match with login credentials, then the system grants access to the user and sends the captured frames to the administrator terminal for human validation. If the captured video frames do not match with login credentials, then the system denies access to the user.

During the registration phase, the Specific Object, which can be used to distinguish people, such as biometrics, and/or the actions are extracted, analyzed and stored. This step has two stages. Stage 1: Generating a representation or set of representations of the Specific Object in the "neutral" stage (such as face, finger, palm) with different directions. (same experience as FACEID). This representation is used to create a 3D composition of the Specific Object. In the case of a face, a "Neutral" is defined as a face that does not have a specific expression. "Neutral" can be defined for other specific objects as being in a particular state. Stage 2: Generating a representation or set of representations of users' expressions/actions—the system asks the user to follow a command, referred to as the KEY. For example, do an expression such as smiling, blinking, pressing the finger against the lens, etc. These representations are used to create a 4D composition of the action/Specific Object. (With the element of time).

There are two types of registration of the unique attributes of the Specific Objects, that is active registration and passive registration. During active registration, the system asks the user to perform certain commands (in the form of actions or responses) to extract and register the bio characters. This happens during onboarding. In passive registration, during the login access verification and continuous authentication phases, the system (with the consent of the user) automatically collects the user's unique attributes, evaluates them, and if needed, updates them on an ongoing basis to create a more robust and comprehensive representation of the user.

During Login Access Verification/authentication phase, the unknown user has to be classified as authorized or non-authorized. If the user is classified as authorized, only then the user gains access.

In passive verification, the system automatically collects data from the sensors, such as camera, microphone, and the keyboard. Once the sensor detects a specific object (as defined earlier in the document, such as face, human voice, finger), it extracts the specific attributes from the detected object and compares them with those of the authorized user and creates a real-time score. If they are similar above a certain threshold, wherein the threshold is considered as key, and the user automatically gains access.

In active verification, the system asks for a Specific Object or action to be performed by the user, referred to as the KEY (more information in the KEY section). Once it detects a specific object, such as face, human voice, finger, or a specific action, it extracts the bio characters from the detected object and compares them with those of the authorized user and creates a real-time score. If the score is above a certain threshold, the user automatically gains access. The threshold can be a fixed threshold or it can be dynamic (based on a variety of factors such as environment, lighting, etc.).

Following successful login authentication (if the user or the entity that is trying to verify the user, opts for continuous authentication), this ongoing process will start. Continuous authentication verifies the correct user for the duration of ongoing work. Once the user is verified through the previous step, the system will run in the background to make sure always the right person has access to the device.

Continuous Authentication is done through a continuous monitoring of access of the user. This monitoring is done through active or passive monitoring of Specific Objects. In Passive monitoring, the system collects the Specific Object or reaction to a KEY on a regular basis, and compares them with the Specific Object of the authorized user and creates a real-time score. In active monitoring, the system asks for a Specific Object, for example action to be performed by the user or reaction to a KEY.

The temporal authentication module creates a real-time score of confidence during the continuous monitoring of access of the user. If the score falls below a certain threshold, the system will block the device. The threshold can be set by the entity that is trying to verify the user. This threshold may be changed over time based on some algorithm. The algorithm is a function of certain parameters that impact the accuracy, such as the ambient lighting (as measured by the camera), or it can be a function of attributes of the background.

In an embodiment, the registration and login verification devices in the system are different. In this case, the user does the registration step in one computer or device, the attributes are extracted, and become a numerical series, then encrypted and broadcasted through network (i.e. Virtual Private Network referred to as VPN) to cloud, server and from there to other device(s) where the verification step may happen. There is also the option of direct communication from one device to another trusted device through VPN.

In the multimodal authentication method, the system asks for a command, or a series of commands by displaying a first or second key instruction. The correct response of the user that matches with the first or second key instruction is referred to as the KEY. There are two types of keys, keys for generic object and keys for specific object. The keys for the generic object type command are associated with generic objects that are not unique and haven't been recorded on the onboarding/registration stage. The keys for specific object are commands that are associated with a specific object and have been recorded in the onboarding/registration stage. In the login verification stage, the detected biometrics and/or the actions are compared with those of the registered user (or in the option of Generic Object a general object/action detection) and in case of a match, the user is verified.

A key instruction is conveyed to the user in a number of ways such as instructions are sent to the display unit (direct instructions in alpha-numeric form), the key is conveyed through audio, key is conveyed in a manner that requires interpretation of what is shown on the screen or through the audio output or a combination thereof. For example, the audio can say "shake your head twice" or the monitor can display a series of dots on the screen which may require the user to focus on a dot (and hence a set of head motions). The dot locations and timing are sent by the "processing unit" or it is a "random number generator". One can envision many other scenarios where adding a required layer of "human intelligence to construct the cues for the human being" can add more security.

By involving the element of interpretation, we create an even larger barrier for bots to be able to bypass our authentication system. Interpretation requires intelligence. The greater the intelligence required to carry out a command or response, the greater the security of the system. In order to spoof the system, the fraudster or bot will need AI that is "equivalent" to human intelligence.

In an embodiment, the response required in response to the key is multimodal, making it a large barrier to replicate the key by anyone else. For example, the system commands the user to perform a certain task (motion) in front of the camera and say a certain phrase sequentially to be able to determine if the detected person is the authorized person and consequently to grant access.

Liveness detection by the system is a security feature that detects if the face or fingertips (or any other physical characteristic) is from the user it's supposed to be and not from someone else or synthetically generated/deepfakes. Liveness detection is a security feature that detects if the person is real and alive. In the case of face biometrics, it determines if the face shown is a live person or photo, a 3D mask, or video. This works by responding time to a key in the case of a real person is extremely faster and more similar to the original attributes captured from a real person during the registration time. Since there is a short window to respond to the key, it's extremely unlikely to be able to generate an acceptable response. There are two methods for liveness detection: active and passive. The active liveness detection is the most accepted within nowadays biometrical solutions. With it, the user performs an action like turning the head, blinking or smiling to verify their identity. In other words, the user must do something in order to prove it's a living person. The passive liveness detection instead, doesn't require anything from the users. They only have to wait until the process is finished while the AI module is running at the back to check the liveliness.

In an example embodiment, face matching and key matching are the two authentication processes that run in parallel in the system to analyse the received information data.

The multimodal authentication system and method disclosed in the present invention provide a secure and reliable solution for user access verification. By combining various forms of information data and AI analysis, the system enhances security and reduces vulnerability to attacks. The system can be employed across various devices and applications to ensure user access while maintaining robust security measures.

In another aspect of the present disclosure, the multimodal authentication method further comprises step of memory-based access. This step is used as an extra authentication method to retrieve the access, when other authentication methods are not available, for example when the internet is down, or the user is in dark environments. For example, just as a user memorizes their password, the user can memorize a sequence of actions using combinations of Specific Objects and General Objects to "log in".

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

While the invention has been described in connection with what is presently considered to be the most practical and various embodiments, it is to be understood that the invention is not to be limited to the disclosed embodiments, but on the contrary, is intended to cover various modifications and equivalent arrangements.

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

LIST OF REFERENCE NUMERALS

| | | |
|---|---|---|
| 100 | — | Multimodal authentication system |
| 101 | — | User |
| 102 | — | Device |
| 110 | — | Information-capturing module |
| 120 | — | AI module |
| 130 | — | Memory unit |
| 140 | — | Processor unit |
| 150 | — | Temporal authentication module |
| 160 | — | Display unit |
| 170 | — | Speaker |
| 180 | — | Network |
| 190 | — | Administrator terminal |
| 200 | — | Lens module |
| 201 | — | Laptop camera |
| 210 | — | Mechanical structure |
| 212 | — | Front side of mechanical structure |
| 214 | — | Back side of mechanical structure |
| 216 | — | Recess in mechanical structure |
| 220 | — | Convex lens |
| 222 | — | Near end |
| 224 | — | Far end |
| 230 | — | Front surface |

The invention claimed is:

1. A motion vision-based multimodal authentication system for registering and authenticating a user trying to access an application in a device, the multimodal authentication system comprising:
an information-capturing module configured to continuously capture a real-time video and information data about the user and the user's surrounding; an AI module communicably coupled with the information-capturing module to receive the real-time video and the information data from the information-capturing module, the AI module investigates the liveliness and authenticity of the user and subsequently categorize the information data into an identity data and different predetermined categories to provide one or more categorized data, the AI module is further configured to identify a registered user and a non-registered user;
a memory unit communicably coupled with the AI module to store the identity data of the registered user and non-registered user, the categorized data, and data generated within the multimodal authentication system;
a processor unit communicably coupled with the memory unit to generate a first key instructions for registration and second key instruction for authentication based on the on the categorized data;
a temporal authentication module communicably coupled with the processor unit and the information-capturing module to match the real-time video and information data with the first key instruction or the second key instruction or the identity data to allow or restrict the authorization.

2. The motion vision-based multimodal authentication system as claimed in claim 1, wherein the information capturing module is having a motion picture capturing device configured to capture a live video stream of a device's terminal access field of view and surroundings as a basis mode.

3. The motion vision-based multimodal authentication system as claimed in claim 1, further comprising a display unit and a speaker communicably coupled with the processor unit, wherein the processor unit is configured to display prompts or multiple colours on the display unit or playing audio prompt or music on the speaker.

4. The motion vision-based multimodal authentication system as claimed in claim 1, wherein the predetermined categories are object, biometric, lighting and action.

5. The motion vision-based multimodal authentication system as claimed in claim 4, wherein the predetermined category of the object encompasses one or more multiple objects, wherein one or more multiple objects comprises:
generic objects (GO) including common or generic objects that are not associated with a specific person, such as common objects, torso, hand, Et cetera;
specific objects (SO) including objects that are associated with an identity, which is either a unique object only the user possesses, including an ID document or access to a mobile application or a biometric signature, such as palm, finger, face, Et cetera.

6. The motion vision-based multimodal authentication system as claimed in claim 4, wherein the predetermined category of the biometric comprises one or more bio characters that are unique for every individual and are used to distinguish among different individuals including face, voice, and fingerprints.

7. The motion vision-based multimodal authentication system as claimed in claim 4, wherein the predetermined category of the action comprises facial expressions, eye movement, hand movement, torso movement and common object movement.

8. The motion vision-based multimodal authentication system as claimed in claim 1, wherein the information-capturing module is selected from a video camera, a lens module configured to couple with the camera to work as a fingerprint capture device, voice receiver, fingerprint sensor, infrared sensor, keyboard, mouse, radar imagers, ultrasound sensor, radio frequency sensor, or a combination thereof.

9. The motion vision-based multimodal authentication system as claimed in claim 8, wherein the lens module comprises:
a mechanical structure defined by a transparent body having a front side, a back side, and a recess between the front and back side to fit over a laptop camera;
a convex lens having a near end and a far end is fixed in the front side at a predetermined distance D1 from near end and D2 from far end to the laptop camera, wherein the refractive index of the lens is higher than the mechanical structure; and
a front surface is provided on the front side at a predetermined distance D3 from the far end of convex lens.

10. The motion vision-based multimodal authentication system as claimed in claim 1 further comprising an administrator terminal operated by authorized personnel, the administrator terminal is communicably coupled with the memory unit, the processor unit and the temporal authentication module to manually register the user or provide authorization to the user to access the application.

11. A motion vision-based multimodal authentication method for registering and authenticating a user trying to access an application in a device, the multimodal authentication method comprises steps of:
- registering the user by capturing a video and one or more information data of the user and user's surroundings and storing identity data of the user derived from the captured video and information data; and
- authenticating, the user based on matching a real-time video of the user and the identity data of the user.

12. The motion vision-based multimodal authentication method as claimed in claim 11, wherein the step of registering the user comprises steps of:
- capturing video and information data of the user and the user's surroundings by an information-capturing module;
- investigating the liveliness and authenticity of the user by the AI module based on the video and information data;
- identifying identity data for user registration by the AI module from the video and the information data; and
- storing the identity data in a memory unit, and
- allowing registration of the user.

13. The motion vision-based multimodal authentication method as claimed in claim 12, wherein if the AI module is unable to investigate the liveliness and authenticity of the user, the method further comprises steps of:
- categorizing, by the AI module, video and information data into categorized data;
- processing, by the processing unit, the categorized data in a processing unit to generate at least one first key instruction;
- prompting the first key instruction to the user on a display unit;
- capturing the inputs provided by the user in response to the first key instructions in real time;
- matching, by the temporal authentication module, the inputs provided by the user with the first key instructions in real-time; and
- allowing or denying registration of the user based on the match of the first key instruction with the real-time information data of user's inputs.

14. The motion vision-based multimodal authentication method as claimed in claim 12, wherein the predetermined categories are object, biometric, lighting and action.

15. The motion vision-based multimodal authentication method as claimed in claim 12, further comprises a step of allowing or denying registration of the user by an administrator terminal operated by an authorized personnel.

16. The motion vision-based multimodal authentication method as claimed in claim 11, wherein the step of authenticating the user comprises:
- capturing video and information data of the user and the user's surroundings by an information-capturing module;
- investigating the liveliness and authenticity of the user by the AI module based on the video and information data;
- matching, by a temporal authentication module, the identity data of the user with the real-time video and information data captured by the information-capturing module;
- allowing or denying access of the user based on the match of the identity data with the real-time video and information data.

17. The motion vision-based multimodal authentication method as claimed in claim 16, wherein if the AI module is unable to investigate the liveliness and authenticity of the user, the method further comprises steps of:
- categorizing, by the AI module, video and information data into categorized data;
- processing, by the processing unit, the categorized data to generate at least one second key instruction;
- prompting the second key instruction to the user on a display unit;
- capturing the inputs provided by the user in response to the second key instruction in real time;
- matching, by the temporal authentication module, the inputs provided by the user with the second key instructions in real-time; and
- allowing or denying access to the user based on the match of the second key instruction with the real-time video and information data.

18. The multimodal authentication method as claimed in claim 16, wherein the predetermined categories are object, biometric, lighting and action.

19. The motion vision-based multimodal authentication method as claimed in claim 16, further comprises a step of allowing or denying access of the user by an administrator terminal operated by an authorized personnel.

* * * * *